March 7, 1950   J. S. FORBES   2,499,739
VALVE HANDLE
Filed Jan. 25, 1947

INVENTOR
John S. Forbes
BY: *Christy, Parmelee & Strickland*
ATTORNEYS

Patented Mar. 7, 1950

2,499,739

UNITED STATES PATENT OFFICE 2,499,739

VALVE HANDLE

John S. Forbes, Mount Lebanon Township, Allegheny County, Pa., assignor to Superior Valve and Fittings Company, Pittsburgh, Pa., a corporation of Pennsylvania Application January 25, 1947, Serial No. 724,437

3 Claims. (Cl. 251—150)

This invention relates to valves and is for a handle for valves.

Valves used on high pressure gas cylinders and in high pressure gas and refrigerating lines, as well as others, often require a considerable torque to open or close them. They are commonly provided with handwheels for turning them, but in many cases no operating element is applied to the valve stem, the operator using only a wrench. It is quite common in use, whether a handwheel is provided or not, for the operator to use an oversize wrench and turn the valve with such force, especially in closing the valve, as to permanently damage the mechanism of the valve.

Safety regulations require that cylinders of high pressure gas have a dome-shaped safety cap over the valve end of the cylinder. This cap fits over the valve and is screwed onto a threaded collar at the end of the cylinder. Consequently any handwheel or other operating element must be of a dimension which will not interfere with such cap.

The present invention provides an extensible handle which is small enough to allow application of the safety cap or to meet other space requirements that are no greater than the conventional handwheel but which may be instantly and conveniently extended to supply adequate leverage for easily operating the valve without danger of overstressing the valve mechanism.

My invention may be more fully understood by reference to the accompanying drawings in which.

Figure 1:
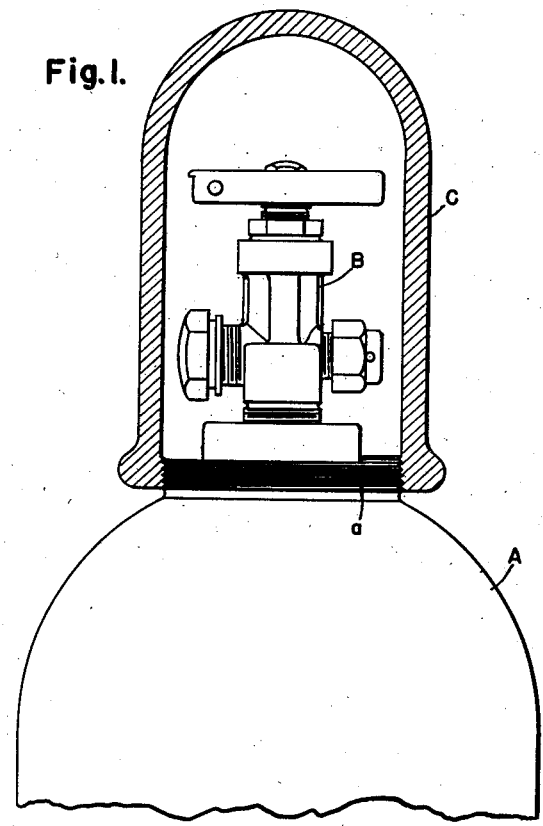
Fig. 1 is a side elevation of a portion of a gas cylinder and valve with an operating handle embodying my invention applied thereto and with a safety cap, shown in section over the valve.

In the drawings, A designates a conventional gas cylinder with a threaded collar $a$ at its upper end and carrying a conventional high pressure valve B at the top, and C designates the removable safety cap screwed to the collar $a$.

Figure 2:
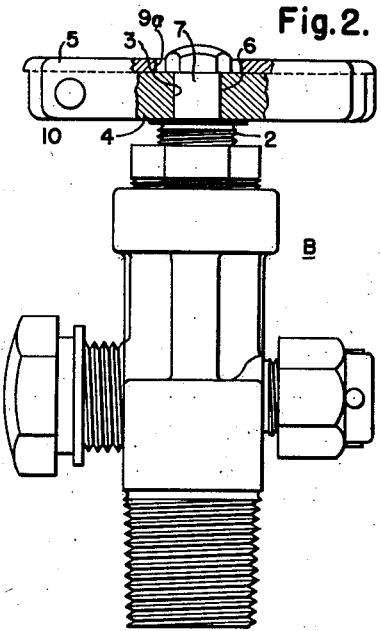
Fig. 2 is a side elevation on a larger scale of the valve and handle, part of the handle being shown in section.
Figure 3:
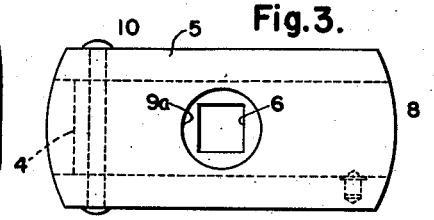
Fig. 3 is a plan view of the handle detached from the valve in normal folded position.

The valve has an operating stem 2 with a squared terminal 3 to which the conventional handwheel is ordinarily applied. According to the present invention the handle is formed of two sections, 4 and 5. The main section 4 is preferably a simple metal bar of rectangular section with rounded ends. It has a square hole 6 therethrough at the middle of a size and shape to fit the squared terminal 3 of the valve stem. In Fig. 2 the handle is applied to the valve stem, and a headed screw or bolt 7 threaded into the end of the valve stem holds the bar 4 against removal from the valve stem.

The other section 5 of the handle is of channel shaped section, having a web portion 8 of a width equal to the width of the bar 4, and it has longitudinally extending flanges 9 of a height equal to the thickness of the bar 4. At its middle the web 8 has a hole 9a therethrough larger than the head of the bolt 7. The ends of the channel-like bar or member 5 are also rounded to the same curvature as the ends of the member 4.

Figure 4:
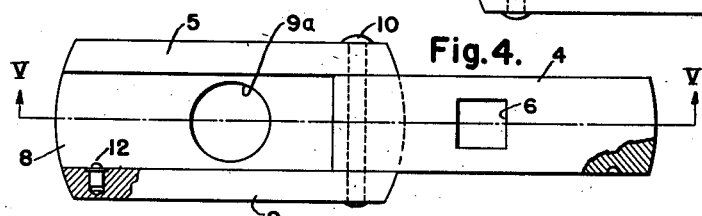
Fig. 4 is a similar view of the handle extended.
Figure 5:
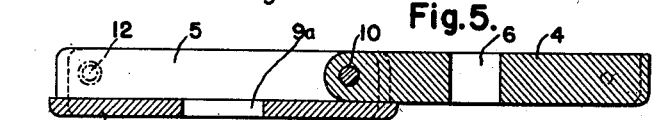
Fig. 5 is a longitudinal vertical section in the plane of line V—V of Fig. 4.
Figure 6:
Fig. 6 is a side elevation of the handle in folded position.
Figure 7:
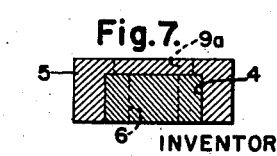
Fig. 7 is a transverse vertical section in the plane of line VII—VII of Fig. 6.

A transverse pivot pin 10 passes through the flanges 9 of the member 5 and through one end or extremity of the member 4, the pin being spaced a short distance in from the ends of both members. It constitutes a hinge pin whereby the member 5 may be moved from the folded position shown in Figs. 1, 2, 3, 6 and 7 to the extended open position shown in Figs. 4 and 5.

In the closed position the handle or operating element is of no greater length than the diameter of the ordinary handwheel and the two members 4 and 5 are nested, forming in effect a single cross bar. If the handle be on a cylinder valve, as shown in Fig. 1, its rounded ends enable the cap C to be applied. At all times the handle may be used the same as an ordinary handwheel, but is easier to grip. However, when additional leverage is needed for turning the valve, the upper member is simply opened out to the position shown in Figs. 4 and 5, in which position it is inverted with respect to its closed position. In this position the web of the upper member inwardly of the pivot pin abuts against the under face of the bar 4, so that the member 5 cannot swing past a horizontal plane. The flanges 9 at the inner ends of the member 5 embrace the sides of the bar, the width of the bar 4 and the distance between the flanges providing a snug working fit. This engagement between the overlapping portions of the flanges and the end of the bar 4 serves to transmit the turning force from the member 5 to the member 4 without straining or shearing the hinge pin, giving transverse rigidity to the extended handle. The hole in the web of the member 5 accommodates the head of the bolt 7 when the handle is closed.

In order that the member 5 may not open too easily, a spring-pressed ball detent 12 serves to releasably engage the flanged member 5 and the bar 4 when one is nested or closed over the other.

While the invention has been specifically described in connection with valves on gas cylinders, it may be used on valves of various kinds and for diverse purposes. The handle is compact, neat appearing, convenient and inexpensive. Various changes and modifications are of course contemplated for different valves or different applications.

I claim:

1. A valve operating handle comprising a channel member having a web with flanges projecting outwardly therefrom, a bar member receivable in a nested position with respect to said channel member and substantially filling the space between said flanges; one of said members having an opening therein for mounting it on a rotatable valve stem in a position with said flanges arranged parallel to the rotational axis of said valve stem and with said web perpendicular to such rotational axis, and a pivot extending transversely of said flanges and connecting said members together for pivotal movement about an axis spaced from said rotational axis and in a plane perpendicular to said rotational axis so that said members may be swung from a nested position to an open position in which one of said members constitutes an extension of the other to provide increased leverage for turning the valve stem in either of two rotational directions.

2. A valve handle as claimed in claim 1 wherein the ends of said two members are rounded to enable the safety cap of a gas cylinder to be fitted over the handle when said members are in a nested position.

3. A valve operating handle comprising a channel member having a web with flanges projecting outwardly therefrom, a rectangular bar receivable in a nested position within said flanges and substantially filling the space therebetween, one of said members having an opening therein midway between its ends for mounting it on a rotatable valve stem in a position with said flanges arranged parallel to the rotational axis of said valve stem and with said web perpendicular to such rotational axis, said members when in nested position cooperating to provide a handle for turning the valve stem on which said one member is mounted in either of two rotational directions, and a pivot extending transversely of said flanges and connecting said members for pivotal movement about an axis spaced from said rotational axis and in a plane perpendicular to said rotational axis from their nested position to an open position in which one of said members constitutes an extension of the other to provide a handle having increased leverage for turning the valve stem in either of two rotational directions, said web having a part engageable with said bar for limiting pivotal movement of said members to about 180° from their nested position, said bar having edges in snug engagement with said flanges to impart rigidity to said members when in their extended position.

JOHN S. FORBES.

REFERENCES CITED

The following references are of record in the file of this patent:

UNITED STATES PATENTS

| Number | Name | Date |
| --- | --- | --- |
| 1,036,379 | Tibbals | Aug. 20, 1912 |
| 1,404,028 | Jones | Jan. 17, 1922 |
| 1,559,097 | Hill | Oct. 27, 1925 |

FOREIGN PATENTS

| Number | Country | Date |
| --- | --- | --- |
| 1,768 | Great Britain | Jan. 26, 1893 |